US009679062B2

(12) United States Patent
Schillings et al.

(10) Patent No.: US 9,679,062 B2
(45) Date of Patent: Jun. 13, 2017

(54) LOCAL RECOMMENDATION ENGINE

(71) Applicant: EXCALIBUR IP, LLC, Sunnyvale, CA (US)

(72) Inventors: Benoit Schillings, Los Altos Hills, CA (US); John J. Thrall, Sunnyvale, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 449 days.

(21) Appl. No.: 14/030,777

(22) Filed: Sep. 18, 2013

(65) Prior Publication Data
US 2015/0081695 A1   Mar. 19, 2015

(51) Int. Cl.
*G06F 17/30* (2006.01)
(52) U.S. Cl.
CPC .............. *G06F 17/30867* (2013.01)
(58) Field of Classification Search
CPC ................................ G06F 17/30867
See application file for complete search history.

(56) References Cited

U.S. PATENT DOCUMENTS

| 2007/0234207 | A1* | 10/2007 | Turakhia ............... 715/530 |
| 2008/0022220 | A1* | 1/2008 | Cheah ............... 715/769 |
| 2009/0271611 | A1* | 10/2009 | Roll ............... 713/150 |
| 2010/0023966 | A1* | 1/2010 | Shahraray et al. ............ 725/34 |
| 2014/0136332 | A1* | 5/2014 | Amit et al. ............... 705/14.66 |
| 2014/0189781 | A1* | 7/2014 | Manickam et al. ............ 726/1 |

* cited by examiner

*Primary Examiner* — Aaron Lowenberger
(74) *Attorney, Agent, or Firm* — James J. DeCarlo; Greenberg Traurig, LLP

(57) ABSTRACT

A recommendation engine and a user profile stored on a user device are employed by the user device to select from a content store, content that is relevant to a current display of the user device. The selected content is combined with the current display to generate the contextually relevant display. The user profile on the user device is updated based on user interaction with the displayed content and the updated profile may be uploaded to the server in accordance with privacy settings associated with the user profile.

20 Claims, 11 Drawing Sheets

LOCAL RECOMMENDATION ENGINE

BACKGROUND

Developments in the Internet, search engines and mobile computing applications have made available numerous sources of products and services to users. In many instances users are overwhelmed with the quantity of information they receive giving rise to problems such as information fatigue and content overload. Recommender systems, which were developed to mitigate these problems, are designed to provide customized recommendations to the users by matching their respective attributes and preferences to the attributes of the services/products being offered. Recommender systems are frequently used on the Internet, for example, on eCommerce websites to automatically recommend products for their customers based on their prior purchase transactions. Similarly, content providers can employ recommender systems for recommending text/audio/video content to the users.

SUMMARY

This disclosure relates to systems and methods for providing real-time recommendations of content items by a user device in a relevant context based on a user profile. A method for dynamically generating displays with recommendations of contextually relevant content is disclosed in one embodiment. The method comprises receiving, by a user device processor, a user profile and information associated with a first plurality of content items for storage on the user device. In one embodiment, communication connection with the server can be terminated upon receiving the recommendation engine, the user profile and the information associated with the first plurality of content items from the server. In one embodiment, the information associated with the first plurality of content items comprises signature information of the plurality of content items, the signature information comprising at least topic categories and relevant keywords associated with each of the plurality of content items. Contextually relevant displays comprising content selected from the first plurality of content items are generated over a predetermined time period. A current context associated with the user device is determined based on a current display of the user device. In an embodiment, text associated with a current display of the user device is extracted. Topic categories and keywords associated with the text are obtained and a subset of the first plurality of content items relevant to the topic categories and the keywords associated with the text are selected. A match between the user profile, the text and the information associated with the selected subset of the first plurality of content items is detected and a content item that is most relevant to the text is presented in the contextually relevant display comprising the current display and the most relevant content item.

In an embodiment, a request for the at least one content item is transmitted to a server and the at least one content item is received for inclusion into the contextually relevant display. In an embodiment, the information associated with the first plurality of content items comprises at least some of the first plurality of content items such as, advertisements.

In one embodiment, user interaction with the selected content item is detected and the user profile is updated to comprise current values of user attributes based on the user interaction. The updated user profile can be transmitted to a server based on the privacy settings associated with the user profile. In one embodiment, upon expiration of the predetermined time period, information associated with a second plurality of content items is received so that content items for generating the contextually relevant displays are selected from the second plurality of content items.

A computing device comprising a processor and a storage medium for tangibly storing thereon program logic for execution by the processor is disclosed in an embodiment. A computing device comprising a processor and a storage medium for tangibly storing thereon program logic for execution by the processor is disclosed in an embodiment. The program logic comprises user profile receiving logic and information receiving logic, executed by the processor, for receiving a user profile and information associated with a first plurality of content items respectively. In one embodiment, the information associated with the first plurality of content items comprises signature information of the plurality of content items, the signature information comprising at least topic categories and relevant keywords associated with each of the plurality of content items. Determining logic, is executed by the processor, for determining a current context associated with the user device, the current context is determined based on a current display of the user device. In one embodiment, the determining logic further comprises profile retrieving logic for retrieving the user profile stored on the user device and extracting logic for extracting text associated with a current display on the user device. Content item selecting logic is executed by the processor, for selecting a content item from the first plurality of content items that is most relevant to the current context of the user device, the most relevant content item is selected based on the user profile and the information associated with the first plurality of content items. Contextually relevant display comprising the current display and the selected content item is generated on the user device by the display logic executed by the processor.

In one embodiment, detecting logic is executed by the processor, for detecting user interaction with the selected content item and the user profile is updated to comprise current values of user attributes based on the user interaction by the updating logic executed by the processor. Privacy settings are retrieved from the initial user profile and the updated user profile is transmitted to the server based on the privacy settings. In one embodiment, the information receiving logic further comprises logic for receiving, information associated with a second plurality of content items upon expiration of the predetermined time period so that content items for generating the contextually relevant displays are selected from the second plurality of content items.

A computer readable storage medium comprising processor-executable instructions is disclosed in an embodiment. The instructions when executed by the processor cause the processor to receive a user profile and information associated with a first plurality of content items for storage on the user device. The user profile and the information associated with the first plurality of content items are employed for generating contextually relevant displays over a predetermined time period. The medium also comprises instructions to determine a current context associated with the user device based on a current display of the user device. A content item is selected from the first plurality of content items as the most relevant to the current context of the user device based on the user profile. The selected content item is displayed in a contextually relevant display comprising the current display and the selected content item on the user device. In one embodiment, user interaction with the selected content item is detected and the user profile is updated to comprise current values of user attributes based on the user interaction. The updated user profile is transmitted to the server based on the privacy settings associated therewith. In one embodiment, the instructions to determine a current context of the user device further comprise instructions to retrieve the user profile stored on the user device and extract text associated with a current display on the user device.

A method for providing real time content recommendations is disclosed in one embodiment. The method comprises the steps of communicating for storage, by a server processor, a user profile to a user device, configuring, by the server processor, the user device with a recommendation module comprising processor executable instructions that when executed on the user device, cause the user device to select content items relevant to a current context of the user device and generate a contextually relevant display on the user device. The method further comprises the step of communicating, by the server processor to the user device, information associated with a first plurality of content items for the selection and generation of the contextually relevant display over a predetermined time period.

These and other embodiments/will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
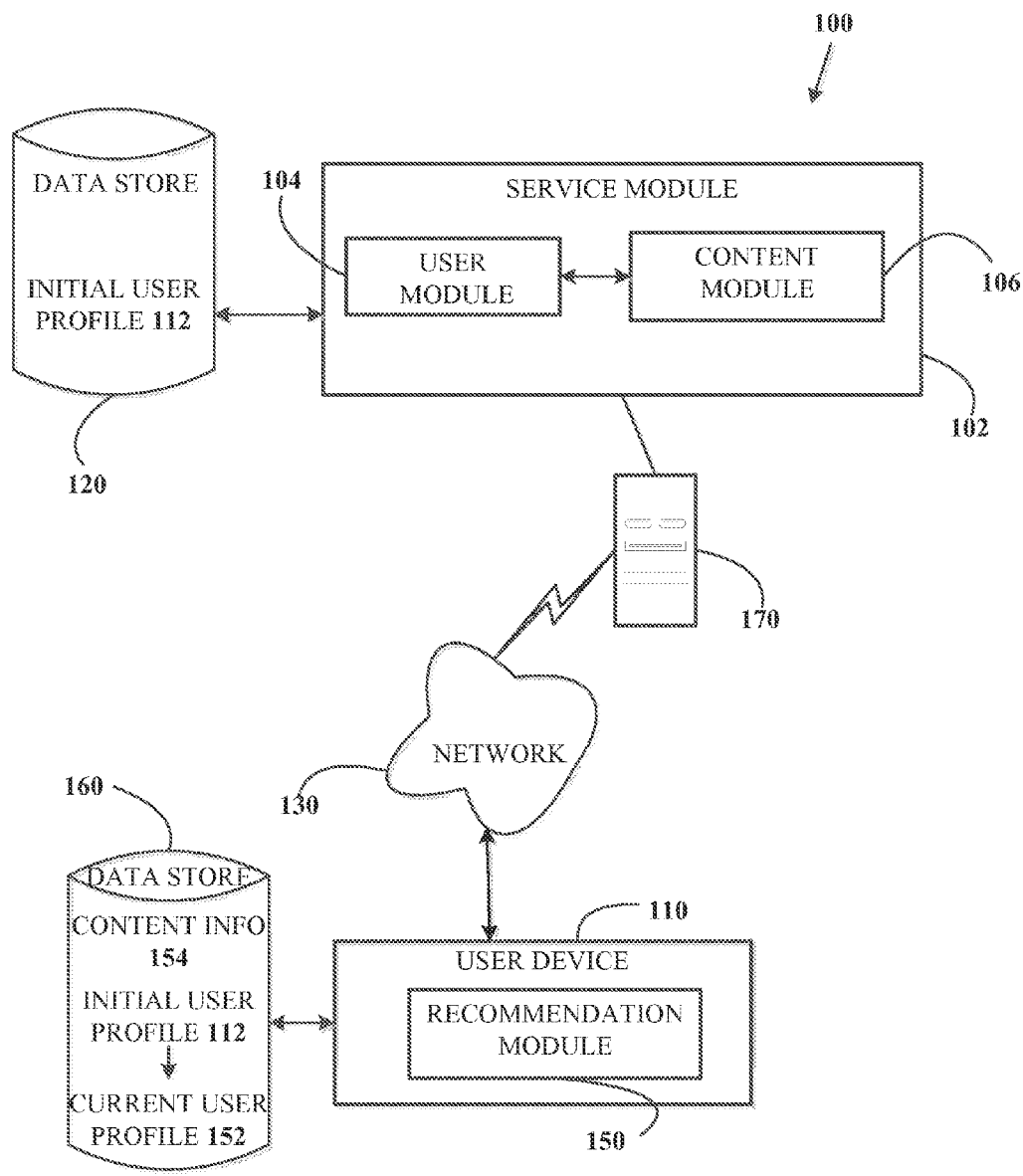
FIG. 1 shows a communication system providing recommender service in accordance with embodiments disclose herein.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Recommender systems make recommendations by matching data regarding attributes and preferences of a user to the attributes of a content or product. While the discussion herein may be based primarily on content recommendation systems it may be appreciated that where applicable, the recommender systems can also include product/service recommender systems. Most recommender systems typically work by storing complex user profile data on the server infrastructure of a data provider so that in order to provide recommendations, the client device should be necessarily connected to the server. Storage of user profiles on remote servers not only imposes strong restrictions on what can be analyzed for user profiling but also imposes latency in communicating the recommendations to the user. In many instances, especially for mobile devices such as smartphones or tablet computers, a network connection with the recommender server cannot always be guaranteed thereby disabling the user from receiving recommendations. Another problem caused by latency is that even if the recommendations are received by the user, they may not be received at the right time thereby decreasing or sometimes even nullifying their value to the user. For example, when providing location-based services such as advertisements for local eateries to a user on the road, even a delay of a few seconds in presenting the advertisement can make a difference between a restaurant gaining or losing a customer. In many instances, the recommendation server may have about 200 mille seconds to catch the user context and provide the relevant related content. Privacy is another consideration with respect to maintaining user profiles on the back-end infrastructure. Users may be reluctant to provide information regarding their personal preferences/profiles due to privacy concerns. In addition, maintenance of massive user profile data that may or may not be relevant can be very expensive for the recommender service provider. Moreover, the information regarding the user that can be collected by the backend server is limited to only those actions taken by users on their user devices which generate network traffic thereby missing data that can be generated when making use of inherent capabilities of the user devices in un-connected mode.

The increasing sophistication of mobile computing devices provides opportunities to mitigate the aforementioned problems. Various embodiments disclosed herein relate to moving at least some of the recommendation processes/modules from the back-end or server infrastructure to a user device as a way of addressing the issues related to network availability and privacy concerns while reducing costs of the recommender service provider. Content can be provided in a relevant context by initially communicating a number of content signatures to the user device in a batch format and the relevant content can be dynamically chosen on the user device without back-end interaction. FIG. 1 shows a communication system 100 providing recommender service in accordance with embodiments disclose herein. The communication system 100 comprises a service module 102 executed on a server machine 170 which is accessible to a plurality of user/client devices such as, user device 110 via a communication network 130. In an embodiment, the service module 102 provides content recommendation service and accordingly, it comprises a user module 104 and a content module 106. The user module 104 facilitates users to register for receiving recommendations in accordance with various embodiments disclosed herein. The content module 106 is configured to collect content items from the various content sources. The collected content is initially filtered and information related to a large volume of content items is transmitted to the user device 110 for the selection and presentation within relevant contexts as will be detailed further infra. It may be appreciated that only one user device 110 is shown for brevity and that a single user can include configure user devices for generating contextual recommendations as detailed herein.

In an embodiment, when a user initially accesses the service module 102 to register for recommendation services, the user module 102 can collect subscription information from the user in order to initially generate the user profile 112. The initial user profile 112 can comprise data such as but not limited to, identification information of the user, preferences regarding products and services, location information, topic categories or preferred keywords associated with content, user device options and social networking services employed by the user and associated data such as friends or contacts of the user. In an embodiment the initial user profile 112 can also be generated from any existing information the service module 102 may have regarding the user. As part of the information collected for the user profile 112, the user module 102 can also obtain information regarding one or more user device(s) 110 for generating the recommendations so that the generated user profile 112 is transmitted for storage on a local data store 160 of the user devices specified by the user. In addition to providing the initial user profile 112, the user module 102 also provisions the user device 110 with a recommender module 150 for providing real-time, context-relevant recommendations. In an embodiment, the user module 102 transmits processor-executable instructions for storage on the data store 160 of the user device 110 and execution by one or more processors included in the user device 110 for generating real-time, contextual recommendations in accordance with embodiments described herein.

In an embodiment, the recommendation module 150 can be configured with various artificial intelligence features so that with continued usage, it can learn more about the attributes and habits of the user and update the initial user profile 112 to stay current with changing user habits and preferences. This can mitigate the recommendation module 150 providing recommendations from stale user profile information. Therefore, the user profile 152 that actually exists within the data store 160 of the user device 110 may not be identical to the initial user profile 112 that was generated by the service module 102. In an embodiment, the recommendation module 150 can be configured to also periodically update the user profile information on the data store 120 so that the services module 102 has access to the latest user habits and preferences and accordingly, the content module 106 can provide relevant content based on the updated information. In an embodiment, the recommendation module 150 does not update the user profile data on the server 170. The recommendation module 150 can be provisioned with the user profile updating functionality based on preferences expressed by the user at the time of registration so that the recommendation module 150 can be configured accordingly prior to its transmission to the user device 110. In an embodiment, the recommendation module 150 can be flexibly configured so that it can be updated at a later date if the user changes the initial preference from keeping the current user profile 152 only on the user device 110 to updating the profile on the server 170 or vice versa.

The content module 106 is configured to receive content from one or more sources and distribute relevant content to the user devices associated with the service module 102. Content digests distributed to the users can include product/service recommendations, audio, video and text content such as articles, video games or even advertisements. In an embodiment, the content module 106 only transmits certain information 154 such as but not limited to signature information associated with each content item of a large volume of content items to the user device 110 for storage. In an embodiment, the signature information can be very small in comparison to the actual data and may comprise topic and relevant keywords associated with the content items in addition to a brief summary of the content or the first few lines of if the content item is a textual content item. By the way of illustration and not limitation, the signature information maybe one percent of the total information sent over a mobile network. In an embodiment, the information 154 can comprise source information of the various data items transmitted to the user device 110 so that the user device 110 need not request the server 170 to provide relevant content.

Various methods currently know or to be known can be implemented in generating/obtaining the signature information. The user device 110 can select one item from the large volume of content items for presentation in a relevant context based on the signature information 154. Again, various content selection and ranking algorithms currently know in the art or to be known can be employed by the recommendation module 150 in selecting the specific item. Upon selecting the content item, the recommendation module 150 requests the service module 102 to transmit the selected content item for presentation to the user in a relevant context. In an embodiment, the information 154 can include the content item itself. For example, content items that do not require large storage capacities where there is little tolerance for network latencies, such as, advertisements can be included in the information 154 sent to the user device so that it can be directly selected by the recommendation module 152 from the local data store 160 for presentation.

The communication connection between the user device 110 and the server 170 can be terminated after the user device 110 receives the content digests. In an embodiment, the content module 106 can be configured to send fresh content digests periodically. For example, content digests transmitted to the user device 110 can become stale after a predetermined time period, e.g., twenty four hours and they may be replaced with new content digests. In an embodiment, the content module 106 can be configured to provide new content digests each time the user device 110 connects to the services module 102 via a particular connection type, such as Wi-Fi. This mitigates the possibility of the data capacity of the user's service plan being employed for content transmission.

In an embodiment, the recommendation module 150 can determine context associated with the user device 110 based on its current display. If any text data is included in the current display of the user device 110, then such text data can be identified via the analysis of the current display and matched with the signature information 154 of the content items to identify relevant content items for the display so that they can be presented in the context of the display. For example, if the display shows a paragraph of an article, keywords/topic categories from the text can be recognized by the recommendation module 150 and a most relevant content item such as an advertisement related to the keywords/topics can be presented on a part of the display along with the text.

The user profiling mechanism is thus implemented on the local handset instead of having all the computational load on a back-end server. Moving the user profile data 152 and parts of the recommendation processing to a user device 110 mitigates many of the issues discussed supra with respect to providing contextual real-time recommendations. As the user profile information 152 and the recommendation module 150 are resident on the user device 110, no connection between the user device 110 and the server 170 is required in order to produce real-time, contextually relevant recommendations in accordance with embodiments described herein. This can also mitigate the network latency to a large extent as there is no traffic associated with exchanging user information. The relevant content is already determined by the user device 110 which contacts the server 170 only to request specific content item. In an embodiment, even the content item need not be requested as it is already included in the information 154 stored on the local data store 160 of the user device 110. Hence such content items are presented almost instantaneously. Moreover, the user profile information 152 can be stored only on the user device 110 without sharing with the server 170 if the user so prefers thereby addressing any privacy concerns the users may have with the profiling information being collected by the recommendation module 150. Of course, it may be appreciated that a trade-off is involved between privacy protection and receiving relevant content if no user profiling data is shared between the user device 110 and the server 170 after the generation of the initial user profile 112. This is because the initial volume of content items periodically received from the content module 106 will only be based on the initial user profile 112 if it is not updated. In addition, it saves maintenance expenditure to the service provider associated with the service module 102 for both maintenance of data and for keeping alive the connections with the millions of user devices to provide contextually relevant, real-time recommendations.

Figure 2:
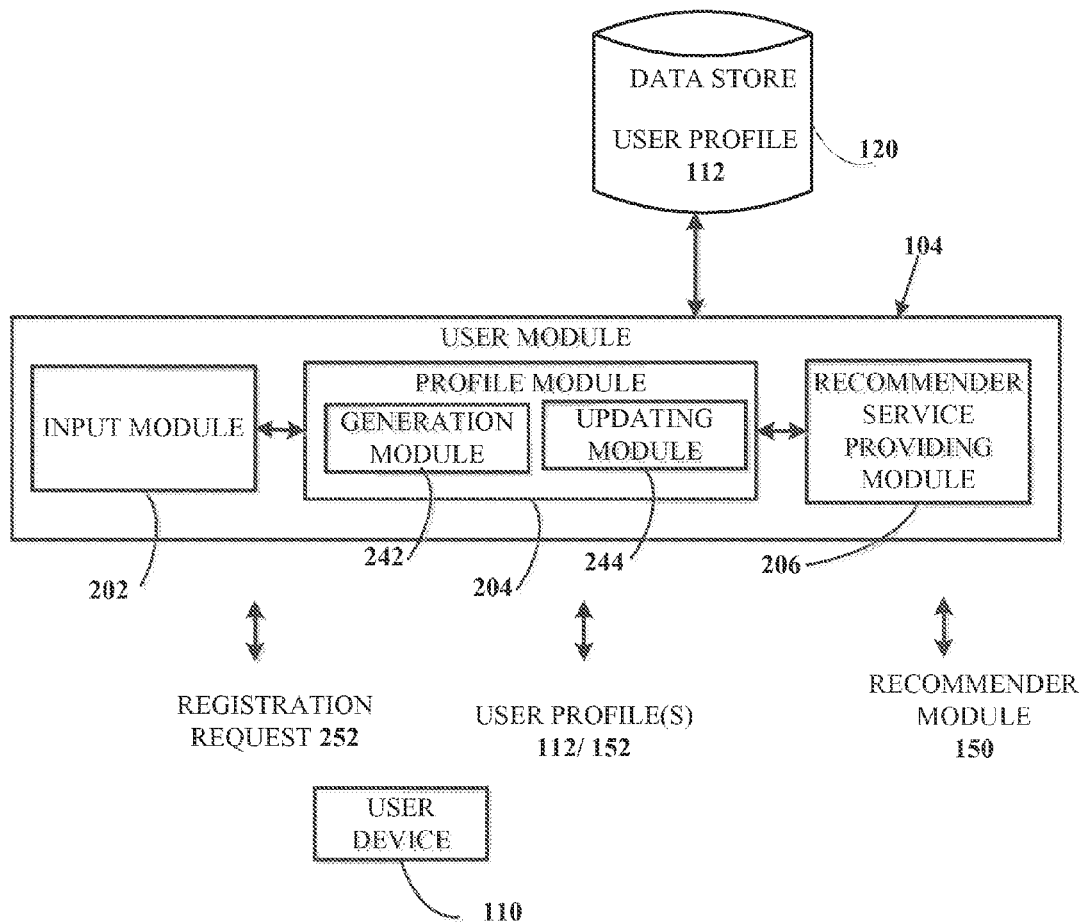
FIG. 2 is a block diagram showing details of the user module in accordance with one embodiment.

FIG. 2 is a block diagram of the user module 104 in accordance with one embodiment. The user module 104 comprises the input module 202 that receives a registration request 252 from the user device 110. In an embodiment, the registration request 252 can comprise a user accessing the page or link to sign up for receiving recommendations from the service module 102. During the registration process, information regarding the user is collected and the initial user profile 112 is generated by the profile module 204. The generation module 242 comprised in the profile module 204 generates the initial user profile 112 based on the information provided by the user. The initial user profile 112 can comprise a list of user attributes which can include user identification information, topics and keywords that are of interest to the user. An initial user profile 112 thus generated is transmitted by the profile module 204 to the user device 110. It may be appreciated that the user profile 112 need not necessarily be delivered to the user device 110 that generates the registration request. It can be transmitted to any other user device specified by the user for storage and use in generating recommendations. In addition, the recommender service providing module 206 provides the recommender module 150 for execution by the user device 110. In addition, the user device 110 also includes an updating module 244 for receiving updated, current user profile 152 from the user device 110. As discussed herein, the initial user profile 112 is employed by the user device 110 for generating recommendations during the early use of the recommender module 150. However, with the continued use of the recommender module 150, it learns more about the user habits and preferences and can update the initial user profile 112 to a current user profile 152 that holds the latest values for user attributes. Based on the user preferences, such as privacy settings, the user profile 152 can be transmitted to the server 170 so that the updating module 244 can keep the current user profile 152 in the data store 120 for use in selecting content digests for periodic transmissions to the user device 110.

Figure 3:
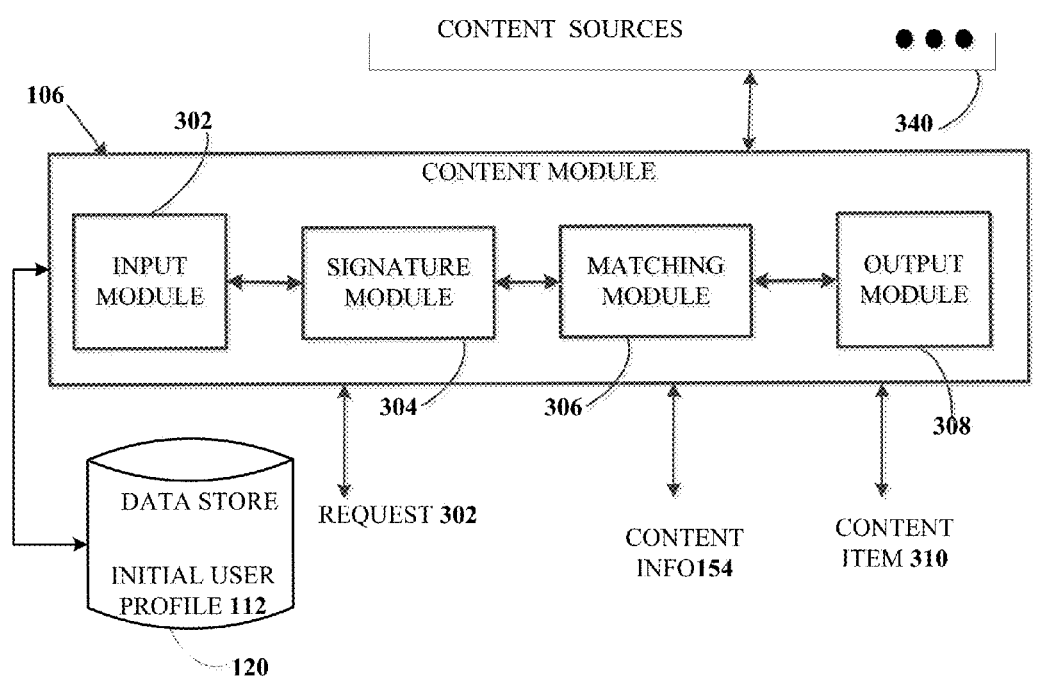
FIG. 3 illustrates a block diagram showing details of the content module in accordance with one embodiment.

FIG. 3 illustrates a block diagram of the content module 106 in accordance with one embodiment. The content module 106 is configured to receive content from a plurality of content sources 340 and periodically transmit at least information regarding the received content to the users who subscribed to the service module 102 based on their respective initial user profiles or current user profiles in the data store 120. In an embodiment, the content module 106 comprises an input module 302 that can be configured to receive numerous content items from the various content sources 340 which is transmitted to the signature module 304. The signature generation module 304 generates signature information for each of the received content items. In an embodiment, the signature for each of the received content items can comprise topic categories, relevant keywords and/or source of each of the content items. Any know methodology or any method to be invented can be employed by the signature module 304 in extracting or identifying the topic categories and keywords for each content item. In an embodiment, the signature of each content item can be stored in the data store 120 for access by the matching module 306 to determine those content items that match preferences of the users as indicated by their profiles in the data store 120. In an embodiment, the user privacy settings can indicate that the user does not wish to share his/her latest profile data with the service module 102. Accordingly, the user profile 112 that was initially generated when the user signed on to receive services from the service module 102 can be employed in identifying the content items that match the user interests/preferences. In an embodiment, a large subset of the received content items can be determined to match the initial user profile 112.

One or more of the information regarding the large volume of matching content items, the content items and the user associated with the initial user profile 112 is communicated to the output module 308 by the matching module 306. In an embodiment, the output module 308 can generate a digest of signatures of the various matching content items. In one embodiment, the content digests 154 transmitted to the user device 110 can comprise a combination of content items and signature information of the same or different content items. The output module 308 can transmit the digest periodically, for example, every night/morning to the user device 110. In an embodiment, the output module 308 can be configured to transmit the digests 154 at different times. The digest can be transmitted when the user device 110 logs in to the server 170 via a Wi-Fi network thereby ensuring that sufficient bandwidth is available to transmit the digest of content items. As discussed herein, the information regarding the content items 154 or the content digests are received and stored on the data store 160 from which the user device 110 can provide selected items in a relevant context in real-time in accordance with embodiments described herein. When one of the content items is selected by the user device 110 for displaying in a relevant context, a request 302 for the selected content item is received by the content module 106. In response to the request 302, the content module 106 transmits the selected content item 310 for display in the relevant context on the user device 110.

In an embodiment, the digests that are periodically transmitted to the user device 110 can also include the content items itself. In this case, the procedure for generating the user request and subsequent transmission of the content item is not executed. Rather, the user device 110 can retrieve the selected content item from the local data store 160 and include it in a contextually relevant display. This method can produce real-time content recommendations with no latency as the network 130 is not accessed in this process.

Figure 4:
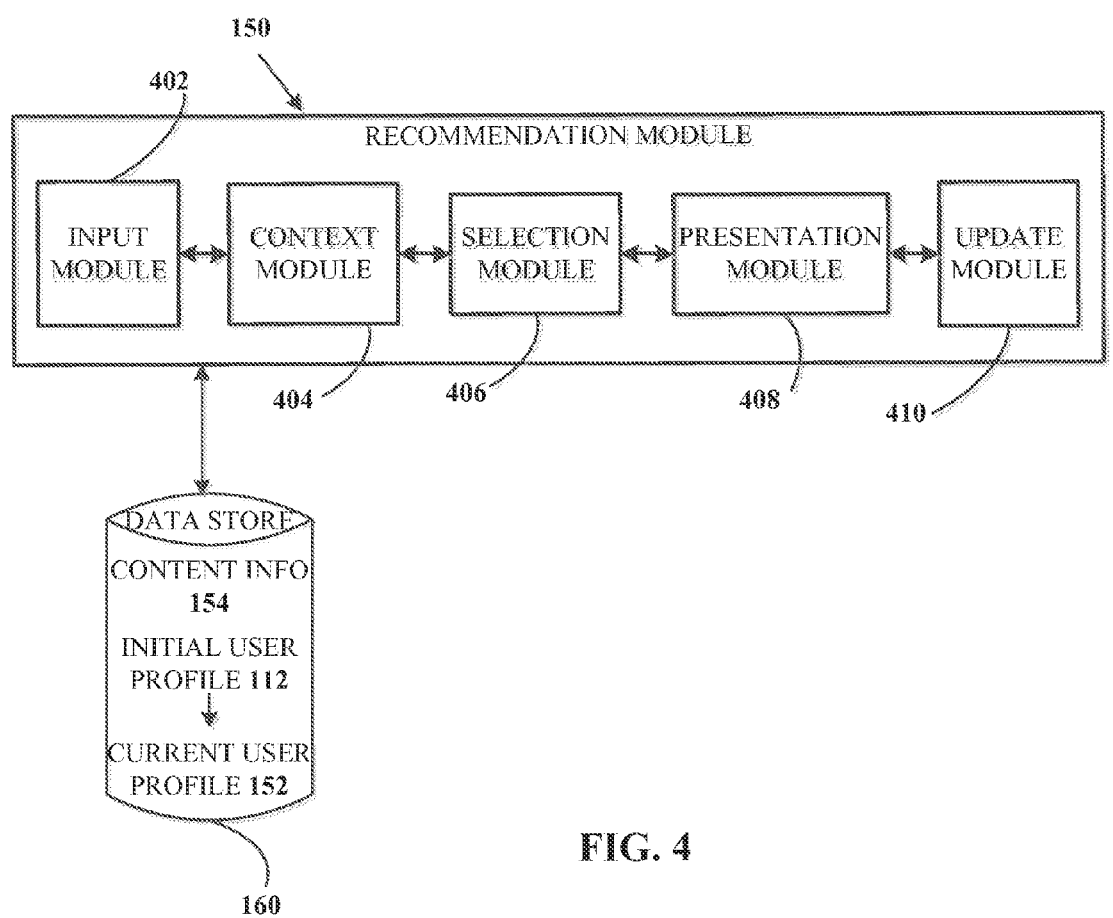
FIG. 4 illustrates details of the recommendation module in accordance with one embodiment.

FIG. 4 illustrates details of the recommendation module 150 in accordance with one embodiment. The information regarding the content 154 selected by the content module 106 based on a user profile in the server data store 120 is received periodically by the input module 402 and stored in the local data store 160 of the user device 110. In an embodiment, the information regarding the content 154 can comprise content digests that include signature information of the various content items that match the initial user profile 112 stored on the server data store 120. In an embodiment, the information regarding the content 154 can include the content itself which is stored in the local data store 160 of the user device 110.

A context determination module 404 comprised within the recommendation module 150 is configured to determine the current context associated with the user device 110. By the way of illustration and not limitation, the context determination module 404 can collect different types of information associated with the user device 110 such as temporal data including date/time, topical data such as the applications stored and/or currently being executed on the user device 110 and a current display of the user device 110.

In an embodiment, the current display of the user device can be analyzed to determine the type of data presented therein such as image, video or text data or combinations thereof. If text data is associated with the current display, then such data can be used selection of appropriate content based on the content information 154. Thus, the context determination module 404 determines current context in terms of temporal data or topical data and transmits it to the selection module 406 for selection of relevant content.

The selection module 406 is configured to select context relevant content items from the information regarding the content items 154 and the current user profile 152. In an embodiment, during the initial use of the recommendation module 150, it may be appreciated that the current user profile 152 is the same as the initial user profile 112. The information regarding the content items 154 comprises signature data that includes topic categories and keywords associated with each of the content items determined by the services module 102 as likely to be of user interest based on the user profile in the server data store 120. In an embodiment, the selection module 406 can initially filter the content items to select a subset of the content items for estimating the dot product thereby simplifying the computational complexity of the selection process. The selection module 406 is configured determine a three-way match between the current display of the user device 110, the signature information of the subset of content items and the user profile stored in the local data store 160 such as the current user profile 154. In an embodiment, the dot product of the vectors representing the subset of content items, user profile and the text of the current display can be estimated and based on the dot product value, the similarity or relevance of a given content item of the subset to particular text displayed on the screen in view of the user profile 152 can be determined. A content item whose dot product with the user profile and the context is zero can be selected as the most relevant to the determined context. A real-time contextually relevant display including the selected content item is thus generated. It may be appreciated that a possibility exists wherein only a subset of the large number of content items initially transmitted to the user device 110 are actually viewed by the user in contextually relevant displays and a majority of the content items whose information was initially transmitted to the user device 110 may be deleted without ever being viewed by the user.

The presentation module 408 receives the information regarding the selected content item from the selection module 406 and generates a contextually relevant display including the selected content item. If the information regarding the content 154 comprises signature of the content items, the presentation module 408 can be configured to request the services module 102 for the selected content item. The contextually relevant display is generated upon receiving the content item from the services module 102. In an embodiment, the content item can be included in the initial information 154 sent to the user device 110 so that it is retrieved in real-time directly from the local store 160 without any need to contact the communication network 130 thereby mitigating network latency. For example, if the user profile 152 lists topics/categories of user interest as astronomy and the current user context indicates that the user is reading an article about a telescope in Hawaii, then a contextually relevant display including an advertisement for flights to Hawaii can be generated by the recommendation module 150 even when disconnected from the service module 102.

The update module 410, also comprised in the recommendation module 150 on the user device 110, is configured to determine if there was any user interaction with the content item included in the contextual display generated by the presentation module 408. For example, user selection of the content item for further review or user input hiding the content item or even no user interaction can be recorded by the update module 410 for applying to the user profile 152. Based on the user interactions the update module 410 can be further configured to update the user profile stored on the local data store 160 of the user device 110. The current user profile 152 updated with the latest user attributes can be transmitted to the services module 102 for storage on the server data store 120 in accordance with the user permissions or privacy settings.

Figure 5:
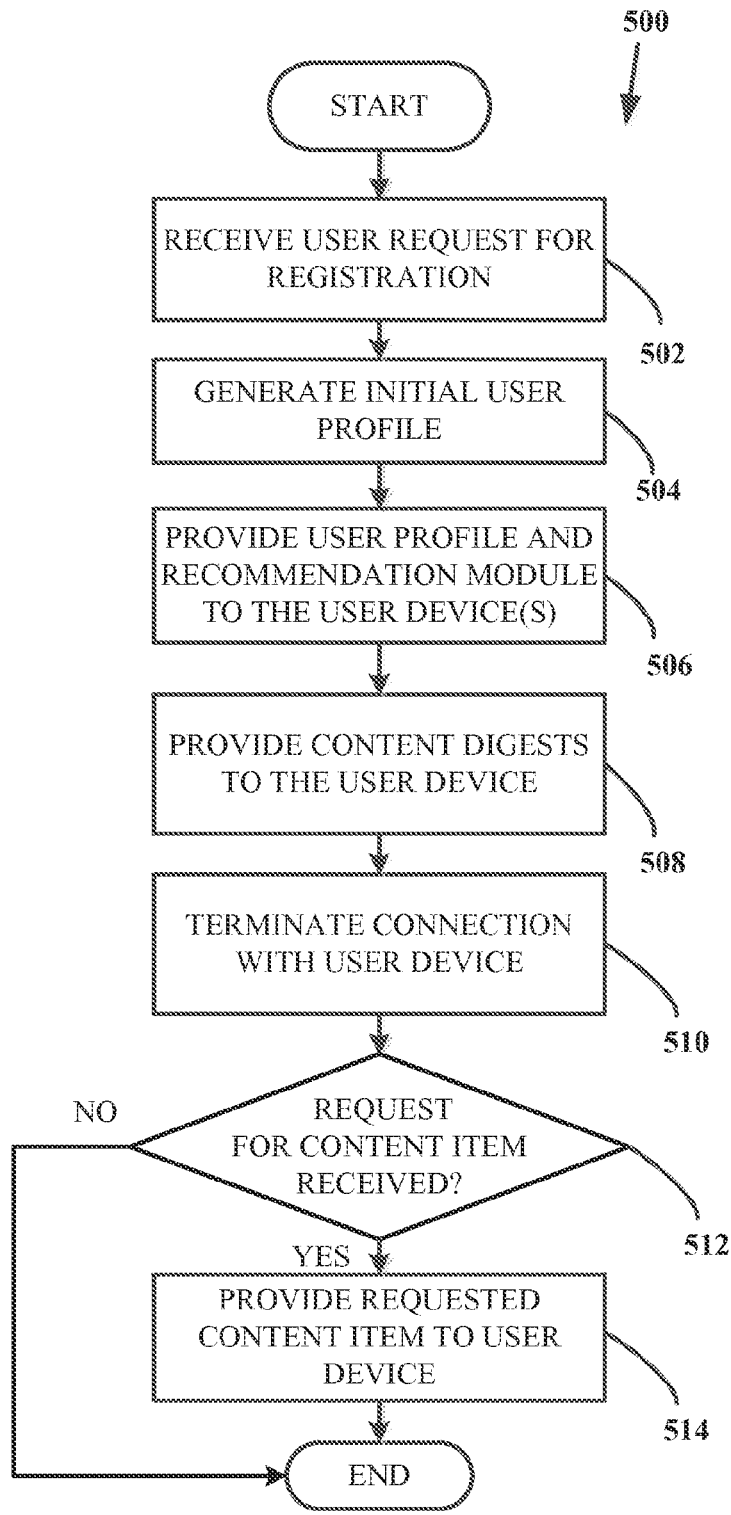
FIG. 5 illustrates a flowchart detailing a method of providing contextually relevant content in accordance with one embodiment.

FIG. 5 illustrates a flowchart 500 detailing a method of providing contextually relevant content in accordance with one embodiment. The method begins at 502 with receiving a user request for registration to receive content recommendations in accordance with embodiments described herein. Upon receipt of the user registration request, an initial user profile is generated at 504 by collecting information from the user through a registration process in which the user may answer questions or select options regarding preferences. The initial user profile 112 and the recommendation module 150 customized to the user settings are provided to the user device 110 at 506. For example, based on the user privacy settings, the recommendation module may or may not include the update module 410. At 508, content digests comprising information regarding the content items 154 selected based on the initial user profile 112 are transmitted to the user device 110 so that the user device 110 can select and present particular ones of the content items in a relevant context. At 510, the communication connection between the user device 110 and the server is terminated upon providing the content digests. When one of the content items from the content digests is subsequently selected for presentation in a relevant context, a request for the content item can be received by the services module 102 at 512 and the content item can be provided by the services module 102 to the user device 110 at 514. It may be appreciated that steps 512 and 514 need not be executed in embodiments wherein content itself is stored on the user device 110.

Figure 6:
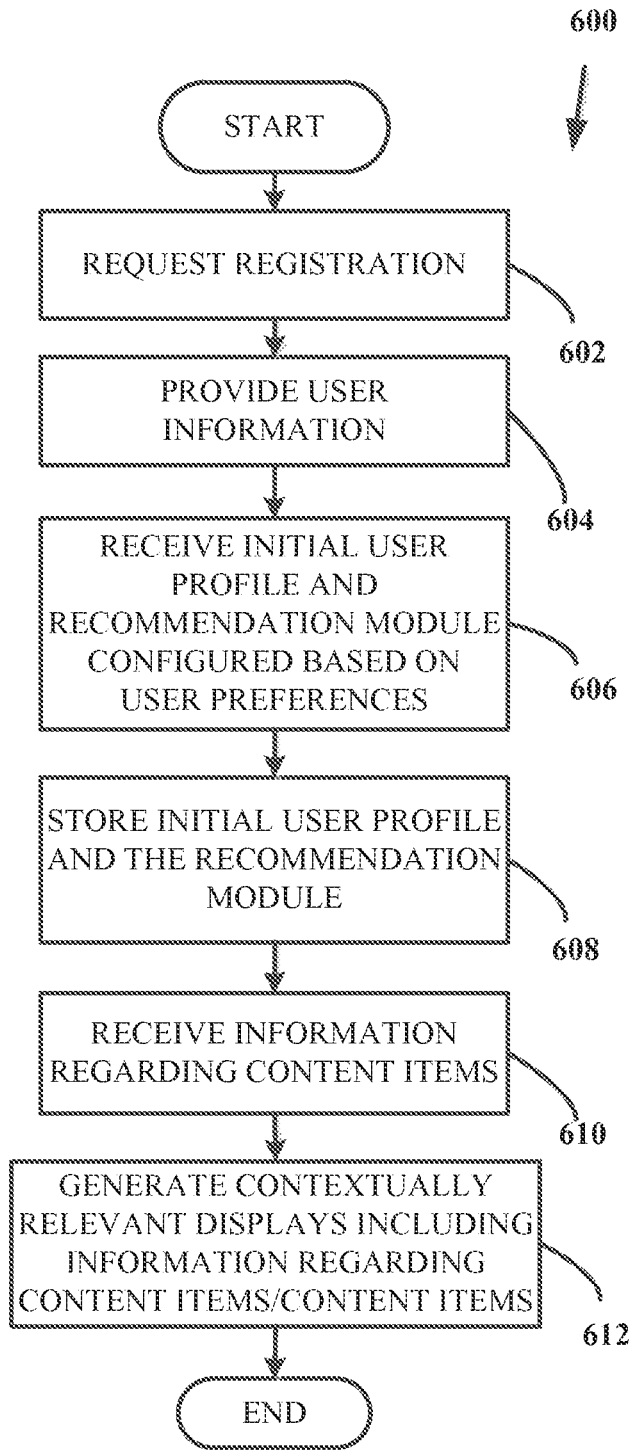
FIG. 6 is a flowchart detailing a method of generating a contextual display by a user device in accordance with one embodiment.

FIG. 6 is a flowchart 600 detailing a method of generating a contextual display by a user device in accordance with one embodiment. The method begins at 602 with the user device 110 transmitting a request for registration with the service module 102 by a user. At 604, information regarding the registering user is provided. The information can include various user attributes which can include without limitation, identification information such as user name, age, and location and user preferences in content, product and services and settings associated with the service module 102. For example the settings can include the various user devices at which the user would like to have contextual displays generated and related privacy settings. The initial user profile 112 generated based on the information supplied at step 604 and the recommendation module 150 configured based on the user privacy settings is received at 606 and stored at 608 in the user device 110. At 610 information associated with content items or content digests 154 related to content determined to be of user interest based on the initial user profile 112 is received. The information can comprise one or more of topics/categories of the content items, short summaries regarding the content item or the first few lines of the content if it is textual content or the content item itself. At 612 specific content items that are determined to be relevant to a current context of a user device 110 are determined and selected for generating contextually relevant displays by the recommendation module 150 in accordance with embodiments detailed herein.

Figure 7:
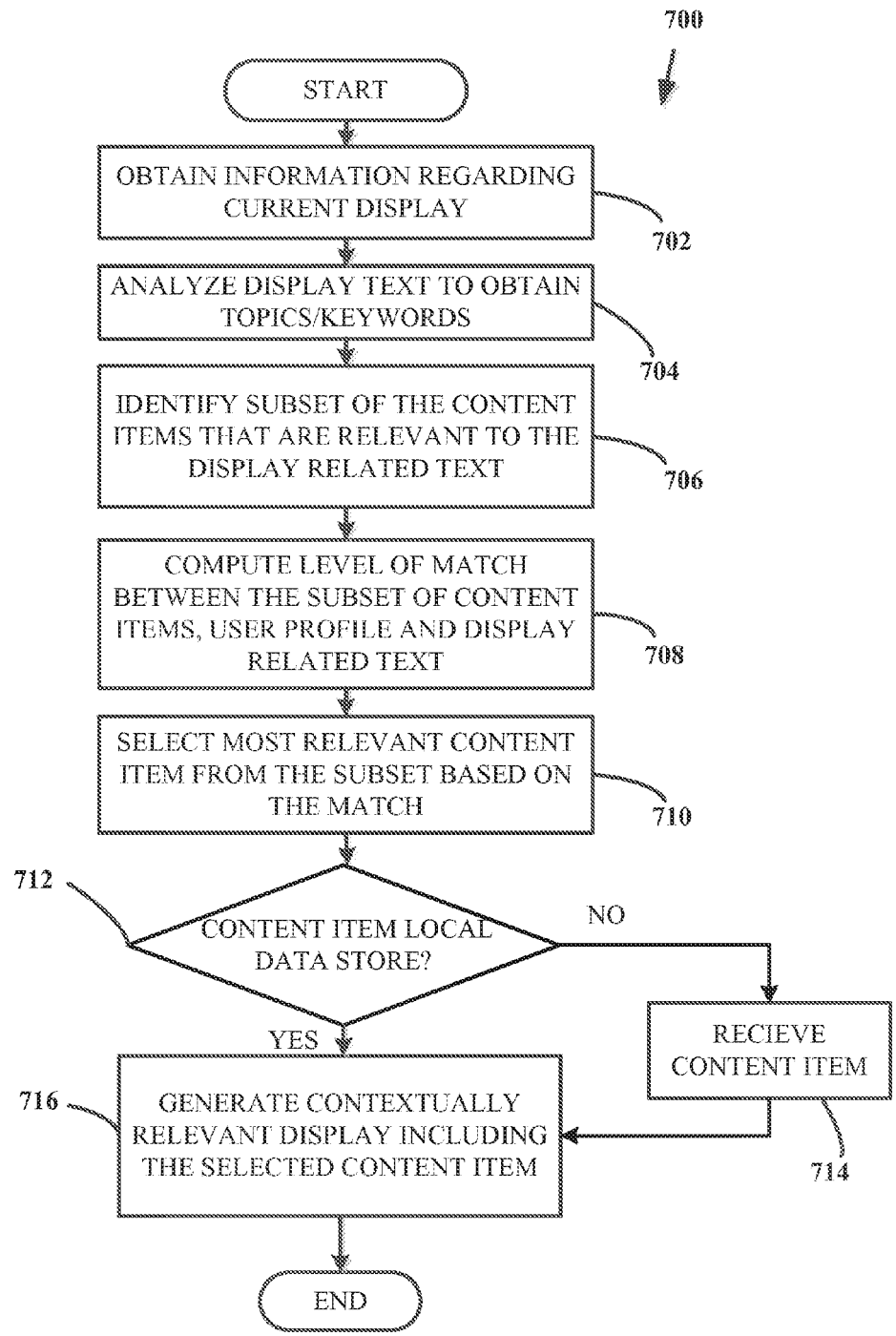
FIG. 7 is a flowchart detailing a method of generating a contextually relevant display executed by a recommendation module installed on the user device in accordance with one embodiment.

FIG. 7 is a flowchart 700 detailing a method of generating a contextually relevant display executed by a recommendation module 150 installed on the user device 110 in accordance with one embodiment. When the recommendation module 150 is stored and installed on the user device 110, it begins to obtain information regarding the current context associated with the user device 110 as shown at 702. For example, the recommendation module 150 can operate as a background process to monitor the usage of the user device 110 and obtain current context information such as the application(s) currently executed by the user device 110 and the displays being generated by such application(s). If text data is associated with a current display on the user device 110 then such text is analyzed as shown at 704 to identify topics/categories or keywords therein. The text associated with the current display can include without limitation, text that is included in the display, text associated with the display, such as, text description associated with images if the display includes images, or text included in the mark up of a webpage. The topics, categories or keywords identified at 704 can include but are not limited to those that are included in the text, categories that are closely related to keywords in the text such as those which may be synonymous or antonyms of the text or those that frequently occur together with the text. As the recommendations need to be produced in real-time, it is desirable to reduce the complexity of computation involved in identifying relevant content from the content digests 154. Accordingly, at 706, a subset of the content items from the content digests 154 obtained from the service module 102 are identified as relevant to the text associated with the current display, for example, via simple text matching techniques or other know or to-be-know text analysis techniques. This simplifies the computational complexity of the matching procedure as the subset generally comprises few of the numerous content items whose information is included in the content digests 154.

For example, if ten thousand items are included in the content digests, only five of the content items may be included in the subset identified at 706. The level or intensity of match between each of the subset of content items, the user profile in the data store 160 of the user device 110 and the text associated with the current display is computed at 708. In an embodiment, a dot product of the vectors representing each content item with the user profile and the display-related text is computed and the most relevant content item is selected from the subset at 710 based on the result. At 712 it is determined if the selected content item is in the data store 160 of the user device 110. If yes, a contextually relevant display is generated at 716 via including the content item in the context of the user device 110. If the selected content item is not in the data store 160 of the user device, it is requested from the service module 102 and received at the user device 110 at 714 and the contextually relevant display is generated at 716. In an embodiment, the contextually relevant display generated at 716 need not include the content item. Rather, it may include a brief summary of the content item or the first few lines of the content item transmitted in the content digests and based on further user interaction, the complete content item can be requested and displayed.

Figure 8:
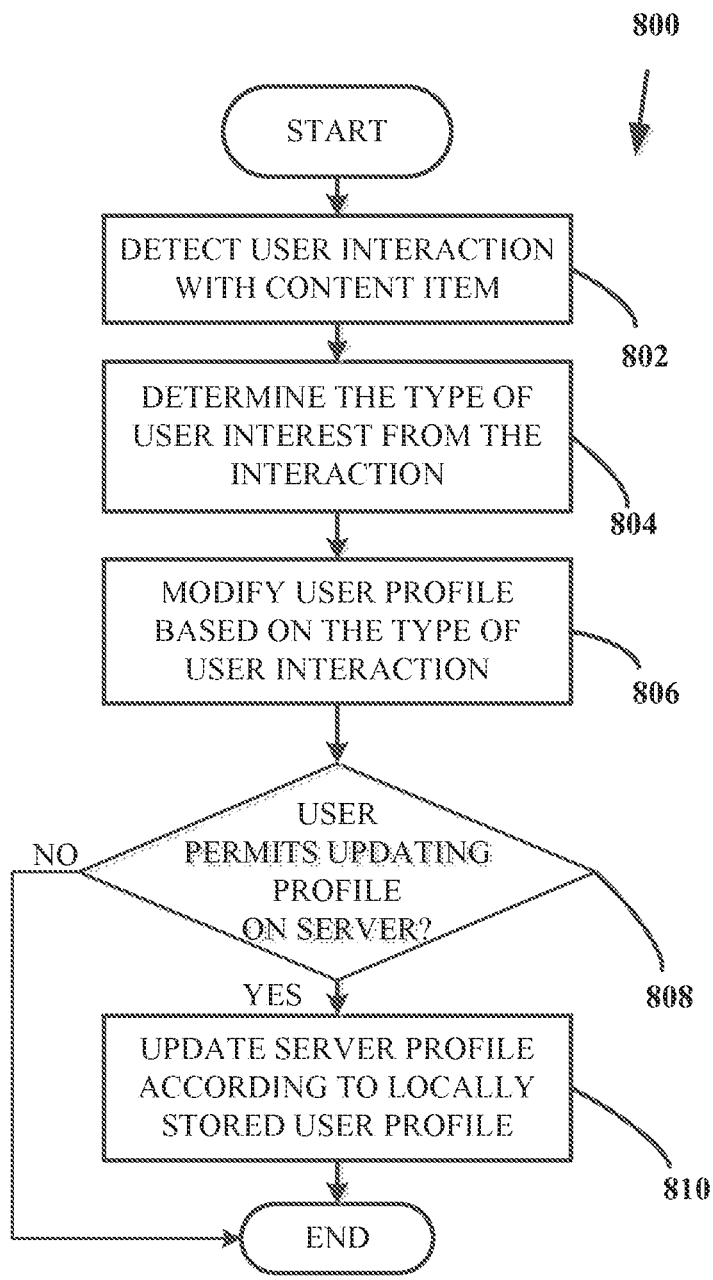
FIG. 8 is a flowchart detailing a method of updating a user profile in accordance with one embodiment.

FIG. 8 is a flowchart 800 detailing a method of updating a user profile in accordance with one embodiment. The method begins at 802 with the recommendation module 150 detecting user interaction with the content item presented in the contextual display. The user interaction can include without limitation selecting the content item for further review, saving the content item, forwarding it to social contacts or ignoring the content item. At 804 the type of user interaction is determined to indicate user interest or disinterest in the content item. For example, it is determined at 804 if the user interaction is indicative of positive user interest or the user actively dislikes the content or if the user is indifferent to the content item. Based on the type of user interest, the user profile locally stored on the user device 110 is updated at 806. In one embodiment, if the user interaction is indicative of positive user interest the topics, categories and keywords associated with the content item are obtained and if already included in the user profile, their weights are increased. If any of the topics, categories or keywords are not included in the user profile they may be added to the user profile. Similarly, if the user expresses indifference or dislikes the content item, the weights associated with the topics or keywords of the content item in the user profile are decreased. At 808 it is determined if the user's privacy settings or preferences allow updating the user profile on the server 170 with the same changes as made to the locally stored user profile. If yes, at 810 the user profile stored on the server 170 or the user profile accessible to the service module 120 is updated with the same changes as applied to the user profile stored on the user device 110. If the user's privacy settings do not permit updating the user profile on the server 170, the process is terminated.

Figure 9:
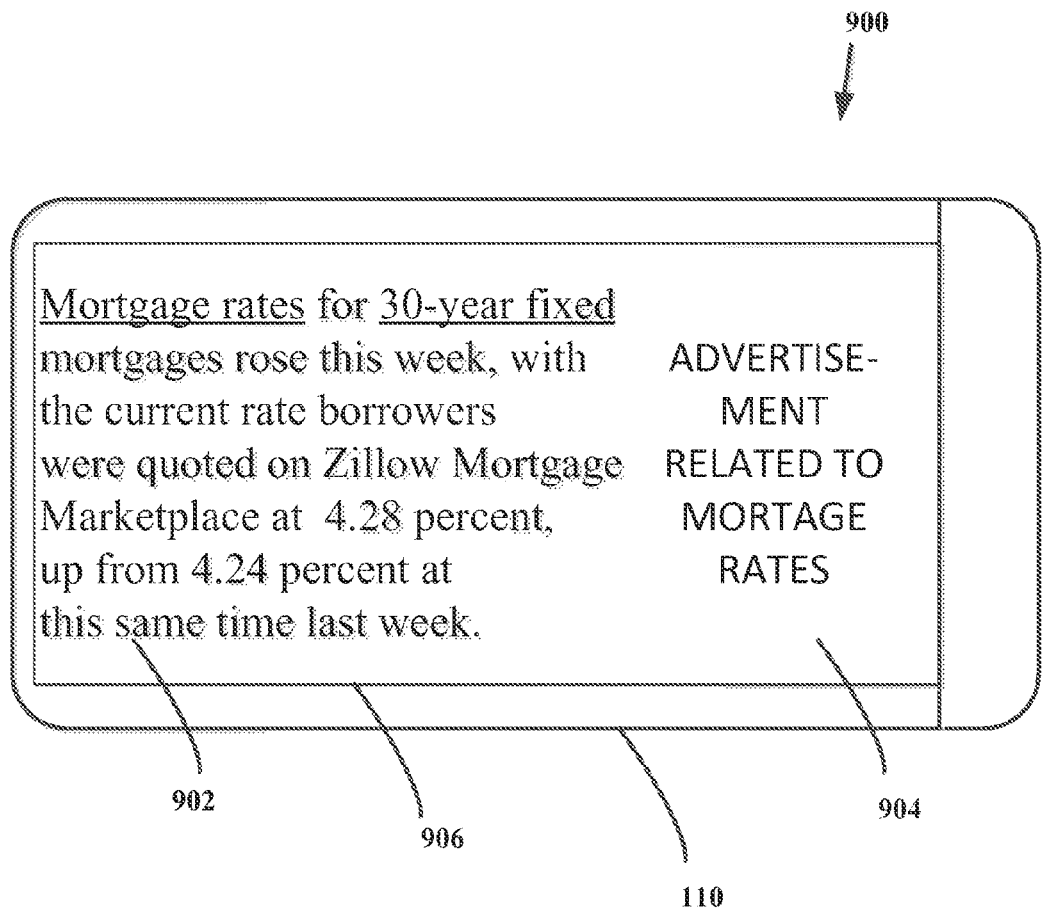
FIG. 9 is a schematic diagram illustrating a contextually relevant display generated by the recommendation module in accordance with embodiments described herein.

FIG. 9 is a schematic diagram illustrating a contextually relevant display 900 generated by the recommendation module 150 on the user device 110 in accordance with embodiments described herein. The recommendation module 150 determined that the text shown on the current display of the user device 110 includes keywords 'mortgage rates' and '30-year-fixed'. Generally these are related to topics/categories such as finance, mortgages or real-estate. Assuming that the user of the user device 110 expressed such interests explicitly or implicitly in the user profile stored on the server 170, it is likely that the content digests 154 that were transmitted by the service module 102 in a communication session and stored on the user device 110 comprise information regarding content items, content items or combinations thereof which are related to the topics 'finance' and keywords 'mortgage rates', '30-year-fixed'. In this example, it is determined that an advertisement offering services of various lenders and informing the user of their mortgage rates is the most relevant of the various content items associated with the content digests 154. Accordingly, the advertisement 904 is presented to the user within the relevant context of the paragraph 902 of the article the user is currently browsing. It may be appreciated that the determination of relevance and the generation of the display 900 can occur without any connection with the service module 102. For example, the contextually relevant display 900 can be generated when the user device 110 is in an 'airplane mode' provided, the content 902 is also retrieved from the local store 160. In fact, the recommender module 150 is configured to determine the display context of the user device 110 as the user scrolls through the content item 902 so that different content items from the content digests 154 can be shown in the area 904 (or any other area) of the user device display 906.

Figure 10:
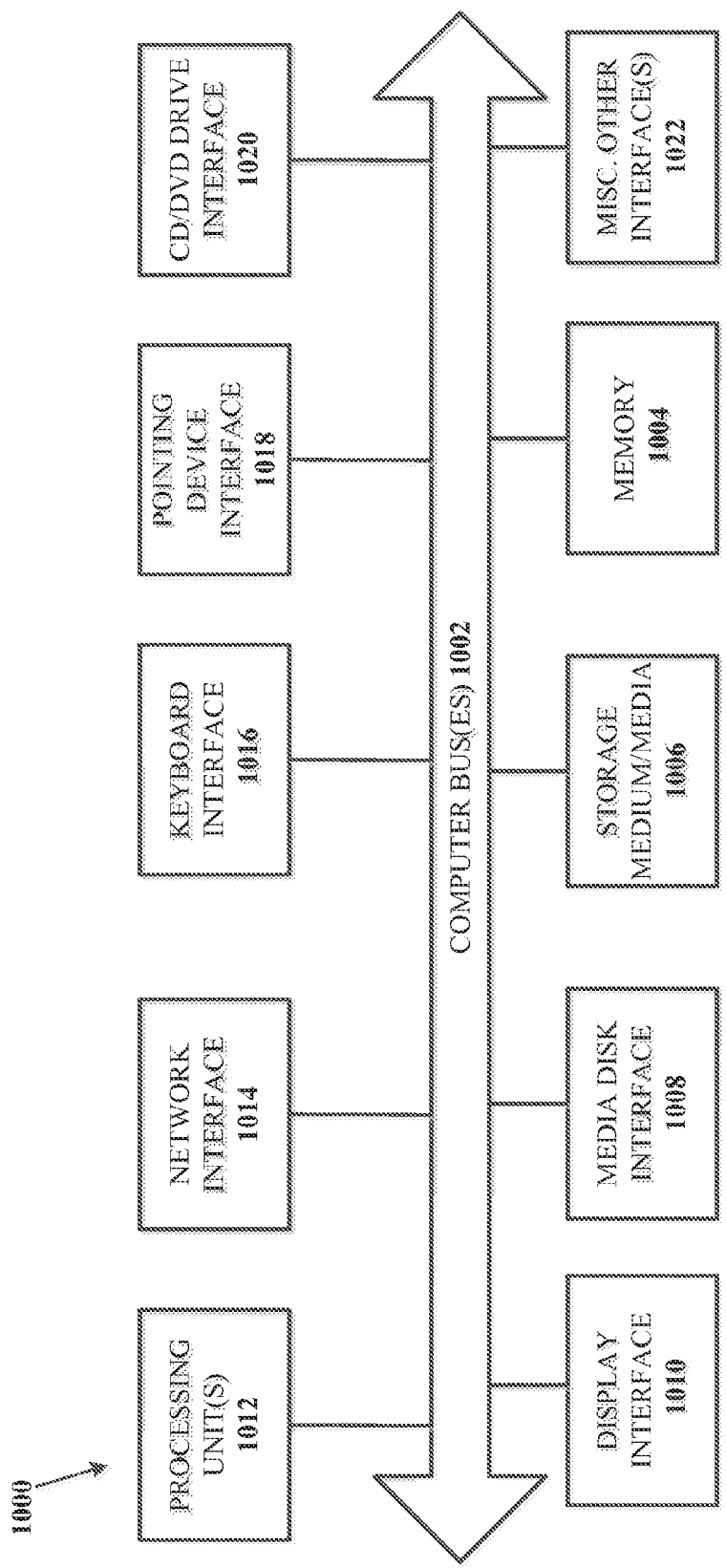
FIG. 10 illustrates internal architecture of a computing device in accordance with embodiments described herein.

As shown in the example of FIG. 10, internal architecture of a computing device 1000 includes one or more processing units (also referred to herein as CPUs) 1012, which interface with at least one computer bus 1002. Also interfacing with computer bus 1002 are persistent storage medium/media 1006, network interface 1014, memory 1004, e.g., random access memory (RAM), run-time transient memory, read only memory (ROM), etc., media disk drive interface 1008, an interface 1020 for a drive that can read and/or write to media including removable media such as floppy, CD-ROM, DVD, etc., media, display interface 1010 as interface for a monitor or other display device, keyboard interface 1016 as interface for a keyboard, pointing device interface 1018 as an interface for a mouse or other pointing device, and miscellaneous other interfaces 1022 not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code or logic, and/or computer-executable process steps, incorporating functionality described herein, e.g., one or more of process flows described herein. CPU 1012 first loads computer-executable process steps or logic from storage, e.g., memory 1004, storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage medium/media 1006 is a computer readable storage medium(s) that can be used to store software and data, e.g., an operating system and one or more application programs. Persistent storage medium/media 1006 can also be used to store device drivers, such as one or more of a digital camera driver, monitor driver, printer driver, scanner driver, or other device drivers, web pages, content files, metadata, playlists and other files. Persistent storage medium/media 1006 can further include program modules/program logic in accordance with embodiments described herein and data files used to implement one or more embodiments of the present disclosure.

Figure 11:
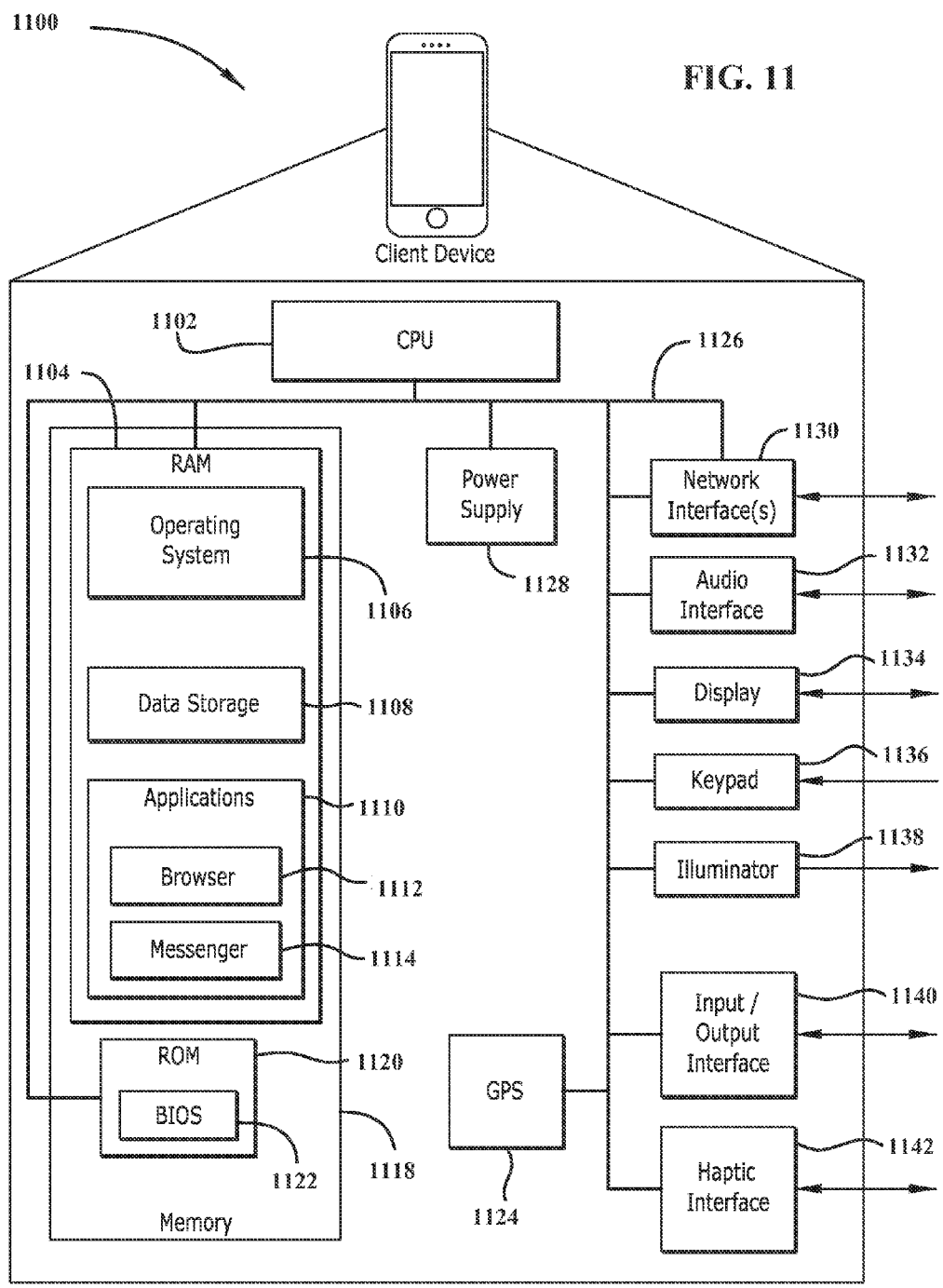
FIG. 11 is a schematic diagram illustrating a client device implementation of a computing device in accordance with embodiments of the present disclosure.

FIG. 11 is a schematic diagram illustrating a client device implementation of a computing device in accordance with embodiments of the present disclosure. A client device 1100 may include a computing device capable of sending or receiving signals, such as via a wired or a wireless network, and capable of running application software or "apps" 1110. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1102, power supply 1128, a memory 1118, ROM 1120, BIOS 1122, network interface(s) 1130, audio interface 1132, display 1134, keypad 1136, illuminator 1138, I/O interface 1140 interconnected via circuitry 1126. Claimed subject matter is intended to cover a wide range of potential variations. For example, the keypad 1136 of a cell phone may include a numeric keypad or a display 1134 of limited functionality, such as a monochrome liquid crystal display (LCD) for displaying text. In contrast, however, as another example, a web-enabled client device 1100 may include one or more physical or virtual keyboards 1136, mass storage, one or more accelerometers, one or more gyroscopes, global positioning system (GPS) 1124 or other location identifying type capability, Haptic interface 1142, or a display with a high degree of functionality, such as a touch-sensitive color 2D or 3D display, for example. The memory 1118 can include Random Access Memory 1104 including an area for data storage 1108.

A client device 1100 may include or may execute a variety of operating systems 1106, including a personal computer operating system, such as a Windows, iOS or Linux, or a mobile operating system, such as iOS, Android, or Windows Mobile, or the like. A client device 1100 may include or may execute a variety of possible applications 1110, such as a client software application 1114 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1100 may also include or execute an application to communicate content, such as, for example, textual content, multimedia content, or the like. A client device 1100 may also include or execute an application to perform a variety of possible tasks, such as browsing 1112, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, by a user device processor via a network, an initial user profile for storage on the user device, the user profile comprising topics, categories and keywords;
receiving, by the user device processor, information associated with a first plurality of content items for generation of contextually relevant displays over a predetermined time period;
determining, by the user device processor, a current context associated with the user device, the current context is determined based on a current display displayed on the user device;
selecting, by the user device processor, based on the user profile, a content item from the first plurality of content items that is most relevant to the current context of the user device;
displaying, by the user device processor, the selected content item in a contextually relevant display comprising the current display and the selected content item on the user device;
detecting, by the user device processor, a user interaction with the selected content item;
determining, by the user device processor, a type of user interest based on the user interaction;
updating, by the user device processor, the initial user profile to create an updated user profile comprising current values of user attributes based on the user interaction with the selected content item, said updating comprising determining if topics, categories and keywords associated with the selected content item are present in the initial user profile, and if present, changing, based on the determined type of user interest, weights of the topics, categories, and keywords associated with the selected content item in the initial user profile, and if not present, adding the topics, categories and keywords to the initial user profile;
retrieving, by the user device processor, privacy settings from the initial user profile; and
transmitting, by the user device processor to a server via the network, the updated user profile when the privacy settings allow updating the user profile on the server.

2. The method of claim 1 further comprising:
terminating, by the user device processor, communication connection with a server upon receiving the information associated with the first plurality of content items from the server.

3. The method of claim 1, further comprising:
receiving, by the user device processor, information associated with a second plurality of content items upon expiration of the predetermined time period so that content items for generating the contextually relevant displays are selected from the second plurality of content items.

4. The method of claim 1, wherein determining a current context associated with the user device further comprises:
retrieving, by the user device processor, the user profile stored on the user device, the user profile comprises topic categories and keywords preferred by a user;
extracting, by the user device processor, text associated with a current display on the user device.

5. The method of claim 4 wherein the information associated with the first plurality of content items comprises signature information of the first plurality of content items, the signature information comprising at least topic categories and relevant keywords associated with each of the first plurality of content items.

6. The method of claim 5, wherein selecting the at least one content item as the most relevant further comprising:
obtaining by the user device processor, topic categories and keywords associated with the text;
determining, by the user device processor, a subset of the first plurality of content items relevant to the topic categories and the keywords associated with the text based on the information associated with the first plurality of content items;

detecting by the user device processor, a match between the user profile, the signature information and the text; and selecting by the user device processor, a content item from the subset as the most relevant content item for presenting in the contextually relevant display.

7. The method of claim 1, further comprising: providing, by the user device processor, initial information from the user for generating the user profile.

8. The method of claim 1, further comprising: transmitting, by the user device processor, a request for the at least one content item; and receiving, by the user device processor, the at least one content item for inclusion into the contextually relevant display.

9. The method of claim 1 wherein the information associated with the first plurality of content items comprises at least a subset of the first plurality of content items.

10. The method of claim 9 wherein the subset of the first plurality of content items are advertisements.

11. A computing system comprising:

at least one processor;

a storage medium for tangibly storing thereon program logic for execution by the processor, the program logic comprising:

user profile receiving logic, executed by the processor, for receiving, via a network, an initial user profile, the user profile comprising topics, categories and keywords;

storage logic, executed by the processor, for storing the user profile;

information receiving logic, executed by the processor, for receiving information associated with a first plurality of content items for generation of contextually relevant displays over a predetermined time period;

determining logic, executed by the processor, for determining a current context associated with the user device, the current context is determined based on a current display of the user device;

content item selecting logic, executed by the processor, for selecting a content item from the first plurality of content items that is most relevant to the current context of the user device, the most relevant content item is selected based on the user profile and the information associated with the first plurality of content items;

display logic, executed by the processor, for displaying the selected content item in a contextually relevant display comprising the current display and the selected content item on the user device;

detecting logic, executed by the processor, for detecting a user interaction with the selected content item;

determining logic, executed by the processor, for determining a type of user interest based on the user interaction;

updating logic, executed by the processor, for updating the initial user profile to create an updated user profile comprising current values of user attributes based on the user interaction with the selected content item, said updating comprising determining if topics, categories and keywords associated with the selected content item are present in the initial user profile, and if present, changing, based on the determined type of user interest, weights of the topics, categories, and keywords associated with the selected content item in the initial user profile, and if not present, adding the topics, categories and keywords to the initial user profile;

retrieving logic, executed by the processor, for retrieving privacy settings from the initial user profile; and transmitting logic, executed by the processor, for transmitting to a server via the network, the updated user profile when the privacy settings allow updating the user profile on the server.

12. The apparatus of claim 11, the display logic further comprises:

request transmitting logic, executed by the processor, for transmitting a request for the at least one content item; and content receiving logic, executed by the processor, for receiving the selected content item for inclusion into the contextually relevant display.

13. The apparatus of claim 11, wherein the determining logic further comprises:

profile retrieving logic, executed by the processor, for retrieving the user profile stored on the user device, the user profile comprises preference information of a user, the preference information comprising topic categories and keywords preferred by the user;

extracting logic, executed by the processor, for extracting text associated with a current display on the user device.

14. The apparatus of claim 11 wherein the information associated with the first plurality of content items comprises signature information of the first plurality of content items, the signature information comprising at least topic categories and relevant keywords associated with each of the plurality of content items.

15. The apparatus of claim 11, wherein at least a subset of the first plurality of content items are advertisements.

16. A computer readable storage medium, comprising instructions, which when executed by a processor cause the processor to:

receive, via a network, an initial user profile for storage on a user device, the user profile comprising topics, categories and keywords;

receive information associated with a first plurality of content items for generation of contextually relevant displays over a predetermined time period;

determine a current context associated with the user device, the current context is determined based on a current display of the user device;

select based on the user profile, a content item from the first plurality of content items that is most relevant to the current context of the user device;

display the selected content item in a contextually relevant display comprising the current display and the selected content item on the user device;

detect a user interaction with the selected content item;

determine a type of user interest based on the user interaction;

update the initial user profile to create an updated user profile comprising current values of user attributes based on the user interaction with the selected content item, said updating comprising determining if topics, categories and keywords associated with the selected content item are present in the initial user profile, and if present, changing, based on the determined type of user interest, weights of the topics, categories, and keywords associated with the selected content item in the initial user profile, and if not present, adding the topics, categories and keywords to the initial user profile;

retrieve privacy settings from the initial user profile; and transmit to a server via the network the updated user profile when the privacy settings allow updating the user profile on the server.

17. The computer readable medium of claim 16 further comprising instructions to:
receive information associated with a second plurality of content items upon expiration of the predetermined time period so that content items for generating the contextually relevant displays are selected from the second plurality of content items.

18. The computer readable medium of claim 16 wherein instructions to determine a current context of the user device further comprise instructions to:
retrieve the user profile stored on the user device, the user profile comprises preference information of a user, the preference information comprising topic categories and keywords preferred by the user;
extract text associated with a current display on the user device.

19. The computer readable medium of claim 16 wherein the information associated with the first plurality of content items comprises signature information of the first plurality of content items, the signature information comprising at least topic categories and relevant keywords associated with each of the plurality of content items.

20. A method comprising:
communicating for storage, by a server processor via a network, an initial user profile to a user device, the user profile comprising topics, categories and keywords;
configuring, by the server processor, the user device with a recommendation module comprising processor executable instructions that when executed on the user device, cause the user device to select content items relevant to a current context of the user device and generate a contextually relevant display on the user device, the selection is based on the user profile;
communicating, by the server processor to the user device, information associated with a first plurality of content items for the selection and generation of the contextually relevant display over a predetermined time period, detection of a user interaction with the selected content item, and determination of a type of user interest based on the user interaction;
configuring, by the server processor, the user device with an update module comprising processor executable instructions that when executed on the user device, cause the user device to update the initial user profile to create an updated user profile comprising current values of user attributes based on user interaction with the selected content item, said updating comprising determining if topics, categories and keywords associated with the selected content item are present in the initial user profile, and if present, changing, based on the determined type of user interest, weights of the topics, categories, and keywords associated with the selected content item in the initial user profile, and if not present, adding the topics, categories and keywords to the initial user profile;
communicating, by the server processor to the user device, information associated with the user interaction with the selected content item for updating the user profile to comprise current values of user attributes; and
communicating, by the server processor to the user device, information associated with privacy settings from the initial user profile for transmitting to the server processor via the network, the updated user profile when the privacy settings allow updating the user profile on the server.

* * * * *